March 25, 1969
H. FRIEDMAN
3,434,405
CAMERA CONTROL CIRCUIT
Filed Nov. 29, 1966
Sheet _1_ of 2
FIG. 1
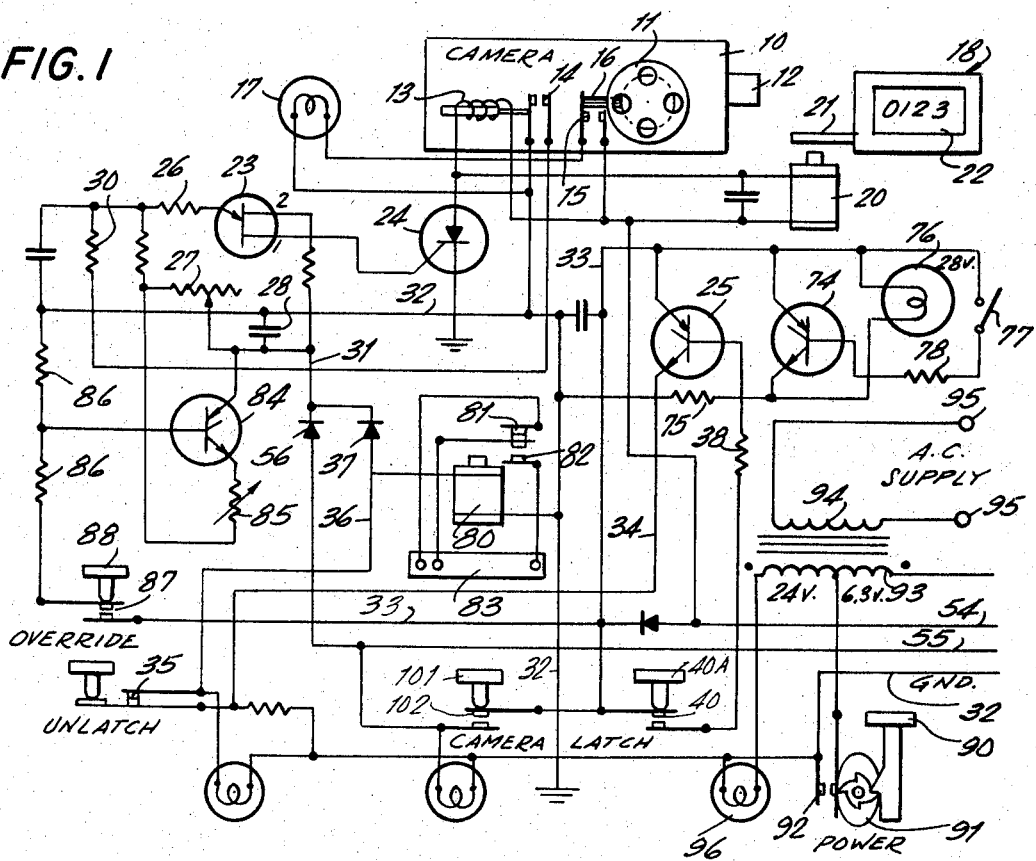
FIG. 2
SILICON
CONTROLLED
RECTIFIER
(POWER)
SILICON
CONTROLLED
RECTIFIER
(SWITCH)
UNI-
JUNCTION
TRANSISTOR
PNP
TRANSISTOR
DIODE
FIG. 3
| FIG. 1 | FIG. 4 |
INVENTOR.
HIRSCH FRIEDMAN
BY Albert H Kronman
ATTORNEY INVENTOR.
HIRSCH FRIEDMAN
BY Albert H. Kronman
ATTORNEY United States Patent Office 3,434,405
Patented Mar. 25, 1969

3,434,405
CAMERA CONTROL CIRCUIT
Hirsch Friedman, New York, N.Y., assignor to Cameras for Industry, Inc., Farmingdale, N.Y.
Filed Nov. 29, 1966, Ser. No. 597,599
Int. Cl. G03b 19/18
U.S. Cl. 95—11                    10 Claims This invention relates to a circuit for controlling a camera installed in a bank, store, or other public place where it may be desired to take pictures of the interior space for security reasons. The invention has particular reference to an automatic and/or a semi-automatic exposure control whereby a predetermined number of sequential pictures are taken in response to a single signal from an operator, sensing switch, or timer.

Motion picture and modified commercial cameras are now being used extensively to record the condition of many interior spaces such as banks, department stores, vaults, and other important places. Generally the cameras are controlled to take a picture at predetermined intervals (example, every ten seconds or every half minute) and, if there is no emergency situation, this record is sufficient. However, if there is an unlawful entry or criminal action of any kind, it is desirable to take many more pictures at a faster rate. The present invention controls a camera to operate in this manner but without wasting a lot of film.

The present invention also provides other signals to denote a power failure or to signal when the film in the camera is exhausted.

One of the objects of this invention is to provide an improved camera control circuit which avoids one or more of the disadvantages and limitations of prior art circuits.

Another object of the invention is to control the operation of a surveillance camera so as to use a minimum of film but still covering all desired unusual actions.

Another object of the invention is to provide instant control over a camera to take many pictures in a short time interval to cover completely any desired occurrence.

Another object of the invention is to reduce the cost of camera control units and to increase the reliability factor for camera operation.

The invention consists of the costruction, combination, and arrangement of parts as herein illustrated, described, and claimed.

In the accompanying drawings, forming a part hereof, there is illustrated one form of embodiment of the invention, in which drawings similar reference characters designate corresponding parts, and in which:

FIGURE 1 is a schematic diagram of connections showing one portion of the camera control circuit.

FIGURE 2 is a legend showing five of the semiconductor circuit elements used in the circuit.

FIGURE 3 is a diagram showing how FIGURES 1 and 4 are to be connected together to form a complete control circuit.

FIGURE 4 is a schematic diagram of connections showing the second portion of the camera control circuit.

Figure 4:
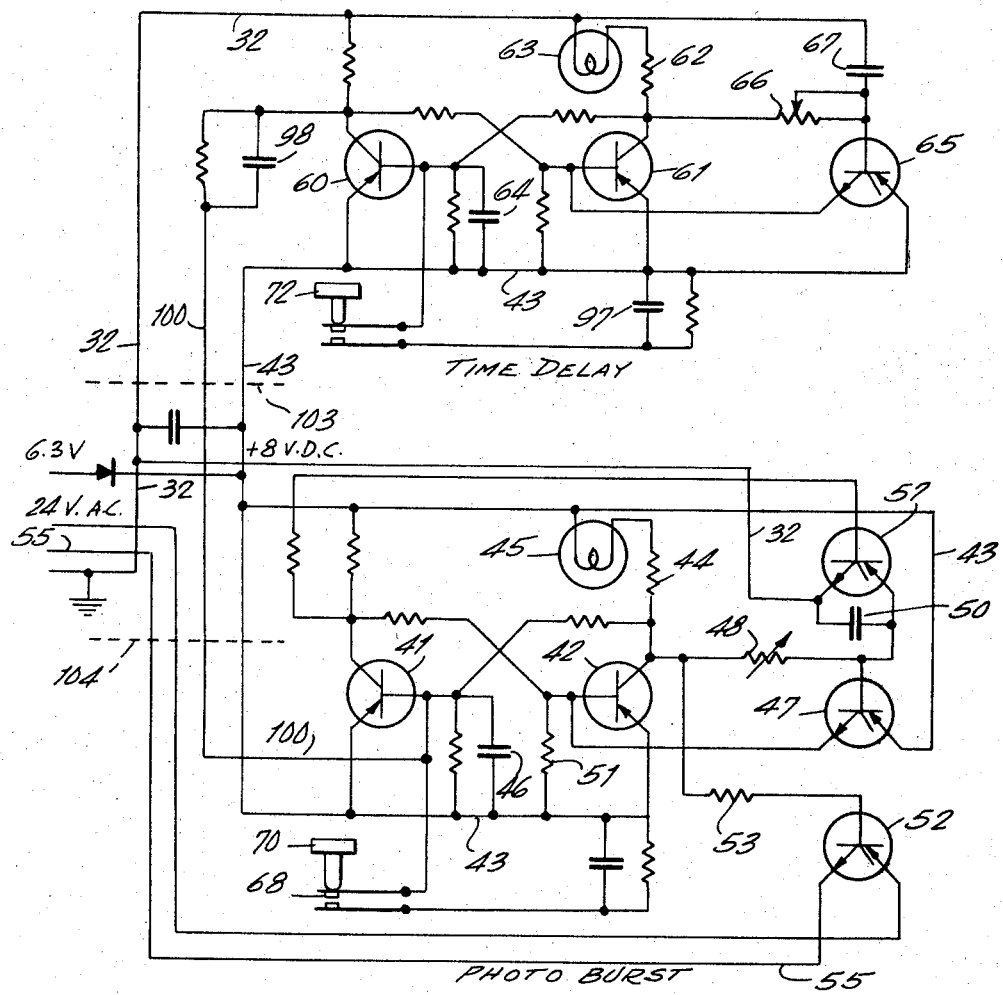

Referring now to the drawings, the circuit includes several circuit elements which cooperate with each other to form a complete controlling means. In the following description some of these circuits will be described as separate elements. The circuit is designed to control a camera 10 which includes a reel 11 containing a supply of film, the usual lens 12, and a solenoid 13 which, when actuated, opens a shutter for a predetermined time interval, and at the same time moves another film frame into position for the next exposure. The details of this structure are not shown or described herein because these components are old in the art and do not form part of the present invention. When the solenoid 13 is operated, the movement of the solenoid plunger closes a pair of normally open contacts 14 at the end of the plunger's travel. Also, for the convenience of an operator, a pair of normally open contacts 15 is coupled to a mechanical sensing arm 16 which rests on the film in the supply reel. When the film is about at the end of its supply, contacts 15 are closed and an indicating lamp 17 is lighted thereby notifying the operator that a new supply of film is needed. A counter 18 is arranged for electrical operation by means of a winding 20 which attracts an armature 21. Winding 20 is connected in parallel with solenoid 13 and receives current each time the solenoid is operated. The counter 18 includes a digital display 22 which indicates the number of pictures taken.

*Firing rate circuit*

A firing rate oscillator is provided for controlling the exposure time and the rate of taking pictures. This circuit includes a unijunction transistor 23 coupled to a silicon controlled rectifier 24. This circuit also includes a second silicon control rectifier 25 which acts as a gate to permit control pulses from other circuits to actuate the firing rate circuit and take a picture. The unijunction transistor 23 has its emitter electrode connected in series with a limiting resistor 26 and a time delay circuit which includes a helical ten turn adjustable resistor 27 and a capacitor 28. This circuit is immobilized by the closure of contacts 14 in the camera. These contacts connect the emitter of the unijunction transistor to ground in series with a limiting resistor 30. The base 2 of the unijunction transistor 23 is connected to a conductor 31 which may receive positive voltage pulses from several sources in order to actuate the circuit and take pictures. The base 1 of the unijunction transistor is connected to the control electrode of the silicon controlled rectifier 24 which has its anode-cathode circuit connected between one end of solenoid 13 and ground conductor 32. Each time the unijunction transistor 23 is activated, a signal is sent from its base 1 to rectifier 24 which is then made conductive and the solenoid 13 and winding 20 both receive current to take a picture and to record a new number on the counter.

The silicon controlled rectifier 25, when made conductive, connects the 28-volt supply circuit (conductor 33) to the oscillator circuit to operate it continuously and to take a plurality of pictures at a fast rate. The rectifier 25 has its anode-cathode circuit connected between a twenty-eight volt direct current supply conductor 33 and conductor 34 which is in series with a pair of normally closed contacts 35 and another supply conductor 36 which is coupled through a diode 37 to conductor 31 and the base 2 electrode. The base electrode of rectifier 25 is connected in series with a limiting resistor 28 and a manually operated switch 40 which is connected to conductor 33. The operation of this circuit will be described later.

*Photo-burst circuit*

The photo-burst circuit comprises a bistable multivibrator which includes two transistors 41 and 42. This circuit includes the usual resistors connected in series with a ground conductor 32 and an eight volt direct current conductor 43. The base of each of these transistors 41 and 42 is coupled through a resistor to the collector electrode of the other transistor. One of the collector resistors 44 is connected in series with an indicating lamp 45 to inform an operator when the multivibrator circuit has been triggered. When this circuit is first turned on, a positive pulse from the actuating line passes through a capacitor 46 and turns on transistor 41. While this circuit is a bistable multivibrator, the collector electrode of transistor 42 is coupled to a controlled rectifier 47 by means of a variable resistor 48 and a capacitor 50. This combination of resistor and capacitor produces a time delay which operates to actuate controlled rectifier 47 and make it conducting after a predetermined time interval. The time interval may be varied over a wide range of values by adjusting resistor 48, this resistor generally being a helical type, comprising many turns. It should be noted that the anode of rectifier 47 is connected to the 8 volt conductor 43 while the cathode of rectifier 47 is connected to the base electrode of transistor 42 and is in series with resistor 51 and the eight volt direct current conductor 43. Rectifier 47 and its associated circuitry form a positive feed-back circuit which changes the bistable multivibrator into a monostable multivibrator and insures that each time conduction is changed from transistor 41 to transistor 42, conduction will be returned to the circuit's original condition. The reason for the positive feed-back circuit is to produce a greater range of time intervals between the actuation and the return to normal of this circuit. Also, the addition of rectifier 47 produces a more positive actuating pulse and insures that the circuit will always be normalized.

The photo-burst circuit is also coupled to another silicon controlled rectifier 52 having its base electrode connected to the collector electrode of transistor 42 in series with a limiting resistor 53. The anode of rectifier 52 is connected directly to the 24 volt alternating current supply conductor 54 while the cathode electrode of rectifier 52 is connected to conductor 55 and one of the diodes 56 whose cathode is connected to conductor 31. This circuit provides a rectified alternating current supply to base 2 of the unijunction transistor 23 and thereby provides one of the several means for actuating the firing rate circuit.

There may be installations which require a considerable time delay between the actuation of the multivibrator circuit and its return to normal. For this reason the values of resistor 48 and capacitor 50 may be quite large. To normalize the circuit, capacitor 50 must be charged to a potential which triggers rectifier 47. After the circuit is normalized, the charge of capacitor 50 must leak off before the circuit can function properly again and if resistor 48 is quite large this may take some time. In order to discharge capacitor 50 in a short time, a third silicon controlled rectifier 57 is added to this circuit with the cathode and anode bridged across the capacitor and the base connected to the collector electrode of transistor 41. With this added rectifier 57, capacitor 50 is discharged as soon as conduction is returned to transistor 41 and the circuit is again ready for another cycle of operations.

*Time delay circuit*

The time delay circuit shown in FIGURE 4 includes a bistable multivibrator circuit similar to the photo-burst circuit. This circuit includes transistors 60 and 61 connected in the usual bistable circuit with one of the collector resistors 62 connected in series with an indicator lamp 63. When the power is first turned on a capacitor 64 transmits a pulse from conductor 43 to the base of transistor 60 to turn it on before transistor 61 can be made conducting. The time delay circuit is coupled to a silicon controlled rectifier 65 which is similar to rectifier 47 in the photo-burst circuit. When the time delay circuit has been triggered to transfer conduction from transistor 60 to transistor 61, a voltage is impressed across a time delay circuit which includes an adjustable resistor 66 and a capacitor 67. When this circuit charges, an activating voltage is applied to the base of rectifier 65 and it is made conducting, thereby applying a positive eight volts from conductor 43 to the base of transistor 61, turning it off and transferring conductance back to transistor 60. As before, in the case of the photo-burst transistor, the addition of rectifier 65, converts the bistable multivibrator circuit into a monostable circuit but with the advantage of a wide range of available delay times. Both the photo-burst circuit and the time delay circuit may be triggered manually by closing contacts 68 by pressing button 70 or by closing contacts 71 by pressing button 72. The manual operation of these contacts is not necessary during the orderly operation of the camera control circuit. These contacts are provided only for emergency service and for testing.

When conductance is transferred back to transistor 60, a pulse is generated which is sent through capacitor 98, over conductor 100 to the base electrode of transistor 41 in the "photo-burst" circuit, triggering it and transferring conductance to transistor 42.

*Power failure indicator*

The power failure indicator circuit is to indicate when power may have been turned off and on during periods when no operator has been in attendance. In the case of power failure, certain adjustments must be made such as, correcting timing indicators and making other adjustments. The power indicator circuit includes a silicon controlled rectifier 74 (FIGURE 1) having its anode connected to conductor 33 and its cathode connected to the ground conductor 32 in series with a limiting resistor 75. A lamp 76 is also connected between the anode and cathode and this lamp will be turned on when the power is first turned on. A switch 77 is connected between the positive conductor 33 and the base electrode of rectifier 74 in series with a resistor 78. This switch must be closed momentarily to start conduction through rectifier 74 and thereby turn off lamp 76 by short circuiting it. If, during the operation of this device, the power fails and then comes on again, conduction through rectifier 74 is eliminated an lamp 76 will be lighted. Again, the lamp must be turned off by the momentary closing of switch 77.

*Relay*

The relay shown in FIGURE 1 is only an accessory to the main control circuit but it is provided in order to turn on or off other indicators such as alarms, lamps, or bells which may be desired to function at a distance. The relay includes a winding 80 connected between the grounded conductor 32 and conductor 36. Normally closed contacts 81 and normally open contacts 82 are provided for actuating the external signals. A terminal block 83 is provided for connection to the external circuits.

The relay is operated only during the time switch 40 is closed. Then the relay is operated each time a picture is taken. The operating circuit may be traced from the 28 volt D.C. supply conductor 33, through the anode-cathode circuit of controlled rectifier 25, normally closed contacts 35, conductor 36, through the relay winding 80 to the ground conductor 32.

*Override circuit*

The Firing Rate circuit may be adjusted to actuate the camera 10 to take pictures at a slow rate, such as one picture every thirty seconds. In case of an emergency, it may be desired to take a number of pictures at a much faster rate, such as a picture every half second. This change in speed is accomplished by an Override Circuit (FIGURE 1) which includes a silicon controlled rectifier 84, an adjustable resistor 85, a voltage divider circuit 86, and a pair of normally open contacts 87 which are closed by a manually operable button 88.

Under normal conditions the override circuit has no effect because the contacts 87 are open and the pulse frequency is determined only by the value of resistor 27 and capacitor 28. When contacts 87 are closed, controlled rectifier 84 is made conductive by voltage divider 86 and the adjustable resistor 85 is connected in shunt with resistor 27, lowering the effective resistance in this part of the oscillation circuit and increasing its pulse frequency.

The operation of the various parts of the control circuit has been described in connection with the above specific descriptions. To turn the circuit on, an "ON-OFF" button 90 is depressed. This button turns a ratchet operated cam 91 to close contacts 92 and connect the central connection of a step-down transformer secondary winding 93 to the ground conductor 32. The primary winding 94 of the transformer is connected to terminals 95 and an alternating current power supply. As long as contacts 92 are closed, indicator lamp 96 is lighted.

The Time Delay circuit (shown in FIGURE 4) is now supplied with about eight volts direct current and transistor 60 is first made conductive by an initial current pulse through capacitor 64. As long as transistor 60 remains conductive, nothing else happens in the circuit and no pictures are taken. The operator next closes contacts 71 by depressing button 72, thereby transferring conductance from transistor 60 to 61 by providing a positive current pulse through capacitor 97. At this time, a positive current pulse is sent through capacitor 98 to the Photo-Burst circuit over conductor 100 to the base electrode of transistor 41. Transistor 41 was made conductive by a current pulse through capacitor 46 in the same manner as transistor 60 was made conductive when the power was first turned on. The positive pulse from the Time Delay circuit transfers conductance from transistor 41 to transistor 42 and, at the same time, a positive pulse is sent to the base electrode of the controlled rectifier 52 making it conductive for the positive halves of the alternating current potential applied to its anode and cathode. The 24-volt A.C. pulses are applied over conductor 55, through diode 56 (FIGURE 1) to base 2 of the unijunction transistor, starting the oscillator circuit and applying current pulses to solenoid 13 in the camera 10 to take a series of pictures.

As described above, the Time Delay circuit is provided with a positive feed-back circuit which causes the conduction of transistor 61 to be transferred back to transistor 60 after a predetermined time interval. This time interval is determined by the values of capacitor 67 and resistor 66. Resistor 66 may be adjusted to provide a time delay of twenty minutes, during which time the Photo-Burst circuit is maintained active.

The Photo-Burst circuit is also provided with a positive feed-back circuit which causes the conduction of transistor 42 to be transferred back to transistor 41 after a predetermined time interval. This time interval is determined by the values of capacitor 50 and resistor 48. Resistor 48 may be adjusted to provide a time delay of ten seconds during which time the unijunction transistor oscillator circuit may be controlled to provide four pulses and cause the camera to take four pictures. The complete operation may be graphically shown in FIGURE 5 where the oscillator circuit produces control pulses to take four pictures, each having an exposure of about one-tenth of a second, the exposure time being set by the camera and is independent of the rest of the control circuit. The pictures are taken at a rate of two per second.

The Photo-Burst circuit is shown having an active ON time of ten seconds and an OFF time of twenty seconds. The Time Delay circuit has an ON time of one and one-quarter minutes. The result is a series of four pictures taken in "bursts" of ten seconds every half minute. This action is repeated for three "bursts" and then the circuit is rendered inactive until an operator starts it again.

The circuit may be operated as described above or it may be controlled to operate in several other ways. In case of an emergency, the operator can depress button 40A, closing contacts 40 (FIGURE 1). This action applies a positive potential to the base of the silicon controlled rectifier 25, turning it on and connecting the 28-volt conductor 33 through the anode-cathode electrodes of the rectifier to the normally closed contacts 35, conductor 36, diode 37, conductor 31 and base 2 of the unijunction transistor 23, causing it to oscillate and take pictures at the predetermined rate established by the circuit which includes resistor 27 and capacitor 28. This type of circuit has been called a "latching" circuit because, when started, it continues to conduct even though contacts 40 are opened. The latching circuit may be normalized by depressing button 35A, opening contacts 35 and making rectifier 25 nonconductive.

If the operator wishes to take a few pictures under control of an actuating circuit, button 101 may be depresesd, closing contacts 102, and thereby connecting the 28-volt supply conductor 33 with the oscillator circuit in series with diode 56. This control is arranged so that pictures will be taken at the normal rate as long as contacts 102 are closed. When the operator releases the button 101 the camera operation stops and no more pictures are taken.

It is contemplated to equip all the installations with all the equipment as shown. These installations may include banks, stores, and storage warehouses where a watchman is in attendance. There may be other installations where there is no operator present and in such cases, it is desirable to make the control circuit more automatic and set it so that it will take pictures all the time. One circuit for doing this comprises the circuit as shown but with the time delay circuit removed. When this is done, conductors 32, 100, and 43 are cut at the position indicated generally by dotted line 103. Then the 8-volt line 43 is connected to the conductor 100 by a jumper. This circuit will then control the oscillator to furnish the camera with a continuous set of pulses arranged in groups as shown in the upper portion of FIGURE 5.

The "Photo-Burst" circuit may also be eliminated by cutting all the conductors at the position generally indicated by dotted line 104. Then contacts 102 are permanently closed and the oscillator will provide the camera with a continuous series of pulses not limited to grouping nor limited by a time delay circuit. The controlled rectifier 25, contacts 40, and contacts 35 may also be eliminated from this circuit.

Figure 5:
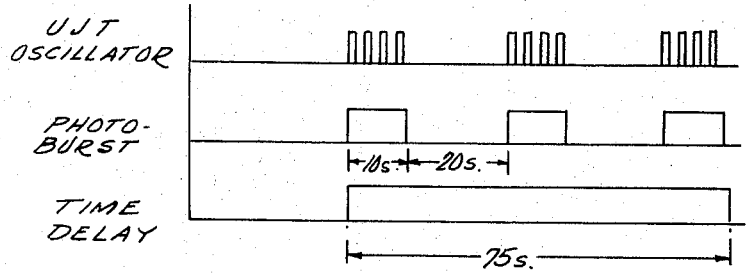
FIGURE 5 is a graph illustrating the operation of the control circuit.

From the above description, it is evident that a flexible camera control circuit can be coupled to a surveillance camera for operating it in a number of predetermined ways. The pulse rates shown in FIGURE 5 are not limiting on the camera operation because adjustments are provided for operating over a wide range of pulse periods, pulse groups, and intervening time intervals.

Having thus fully described the invention, what is claimed as new and desired to be secured by Letters Patent of the United States is:

1. A camera control circuit for operating a solenoid controlled camera to take pictures at a predetermined rate comprising; an electric pulse oscillator coupled to a magnetic actuator in the camera for operating a shutter and for advancing a strip of film; a photo-burst current supply circuit coupled to the oscillator for supplying the oscillator circuit with operating current during a predetermined program at time intervals when the oscillator circuit generates pulses; and a time delay circuit coupled to the photo-burst circuit for supplying the photo-burst circuit with operating current during the time intervals when the photo-burst circuit generates operating current.

2. A camera control circuit as claimed in claim 1 wherein said oscillator is a relaxation type oscillator circuit including a unijunction transistor connected to an adjustable resistance-capacitor circuit.

3. A camera control circuit as claimed in claim 1 wherein said photo-burst circuit is a monostable multivibrator and includes a bistable multivibrator plus a positive feed-back circuit coupled through a controlled rectifier.

4. A camera control circuit as claimed in claim 1 wherein said time delay circuit is a monostable multivibrator and includes a bistable multivibrator plus a positive feed-back circuit coupled through a controlled rectifier.

5. A camera control circuit as claimed in claim 1 wherein a latching circuit is connected between a source of direct current power and the oscillator circuit for operating it continuously, said latching circuit including a controlled rectifier having its anode-cathode electrodes connected in series between the source of power and an electrode in a unilateral circuit element in the oscillator circuit, and a latching switch connected between the base electrode of the controlled rectifier and a source of positive voltage.

6. A camera control circuit as claimed in claim 1 wherein an override circuit is provided for increasing the oscillation rate of the oscillator circuit, said override circuit including a controlled rectifier having its anode-cathode electrodes connected across an adjustable resistor in the oscillating circuit in series with another resistor, and an override switch connected between the base electrode of the controlled rectifier and a source of positive voltage.

7. A camera control circuit as claimed in claim 1 wherein a camera switch is connected between an electrode in a unilateral circuit element in the oscillating circuit and a source of positive direct current power, said camera switch adapted to produce operating pulses for actuating the camera for the time interval during which the switch remains closed.

8. A camera control circuit as claimed in claim 1 wherein a relay is coupled to the oscillating circuit, said relay having a winding connected across one of the electrodes in a unilateral circuit component in the oscillating circuit and the negative terminal of the direct current power supply, said relay also having a plurality of contacts for connection to a series of alarm transducers.

9. A camera control circuit as claimed in claim 1 wherein a power supply indicator is connected across the power supply terminals for providing a permanent indicator of a power supply interruption, said indicator including a controlled rectifier having its anode-cathode terminals connected across the power supply terminals in series with a limiting resistor, an indicating lamp connected across said anode-cathode terminals, and a normalizing switch connected between the anode and the base electrodes of said rectifier.

10. A camera control circuit as claimed in claim 1 wherein said camera includes a solenoid for operating the camera shutter, said solenoid including a movable core which closes a pair of contacts in the camera when the solenoid is actuated, said contacts connected across a capacitor in the oscillation circuit for discharging the capacitor at the end of a picture taking operation.

References Cited

UNITED STATES PATENTS

| 3,011,416 | 12/1961 | Hammer | 95—11 |
| 3,120,160 | 2/1964 | Hammer | 95—15 |
| 3,348,462 | 10/1967 | Fahlenberg | 95—53 |
| 3,386,364 | 6/1968 | Hayden | 95—53 |

NORTON ANSHER, *Primary Examiner.*

CHARLES E. SMITH, *Assistant Examiner*

U.S. Cl. X.R.

95—53